United States Patent
Quay

[15] 3,705,382
[45] Dec. 5, 1972

[54] METHODS FOR IMPROVED DECONVOLUTION OF SEISMIC OR SIMILAR DATA

[72] Inventor: Roy G. Quay, San Antonio, Tex.

[73] Assignee: Petty Geophysical Engineering Company, San Antonio, Tex.

[22] Filed: Feb. 26, 1970

[21] Appl. No.: 14,606

[52] U.S. Cl. ................340/15.5 CC, 340/15.5 MC, 340/15.5 TC
[51] Int. Cl. ................................................G01v 1/28
[58] Field of Search............340/15.5 CC, 15.5 TC, 340/15.5 MC

[56] References Cited

UNITED STATES PATENTS 3,492,469  1/1970  Silverman..........340/15.5 MC
3,409,871  11/1968  Heffring.............340/15.5 CC Primary Examiner—Benjamin A. Borchelt
Assistant Examiner—N. Moskowitz
Attorney—Arnold, White & Durkee, Frank S. Vaden, III, Paul VanSlyke and Tom Arnold

[57] ABSTRACT

Methods for preparing seismic data to be deconvolved comprise the introduction of a time variable correction based on velocity in the reverberating media and dip at the reverberating boundaries. This invention corrects for angularity in the reverberation path introduced by the detector being remote from the source and for the dips of the boundaries by making the undesired reverberations uniformly repetitive. Either normal movement (NMO) or composite corrections for NMO and dip are used depending on the extent of dip of the reflection boundaries, or the degree to which the refraction boundaries are not parallel, to make the reverberations repetitive in time. The modified data is then deconvolved to remove the repetitive noise and retains the desired signals which are non-repetitive. After deconvolution, a second time variable correction, representing the difference between the NMO correction required for the desired primary reflections and the first time variable correction, is applied. The data is then stacked using horizontal stacking techniques or further processed to provide any other desired form of presentation.

6 Claims, 8 Drawing Figures

PATENTED DEC 5 1972

INVENTOR,
ROY G. QUAY
BY Watson, Cole, Grindle & Watson
ATTORNEYS

METHODS FOR IMPROVED DECONVOLUTION OF SEISMIC OR SIMILAR DATA

FIELD OF THE INVENTION

This invention relates primarily to the processing of seismic reflection or refraction data. It is particularly applicable to marine seismic data but is also frequently applicable to seismic data recorded on land. Reverberations and multiple reflections mask primary reflections or refractions in many areas. Conventional deconvolution has been adequate for data from detectors near the source if the surface and subsurface boundaries are parallel. If the detectors are remote from the source or if the boundaries are not parallel, conventional deconvolution has not been adequate and frequently deteriorates the data. The methods disclosed herein are applicable to Sonar techniques or seismic processing techniques in general.

DESCRIPTION OF THE PRIOR ART

In reflection seismic exploration, a seismic source is excited at or near the surface, seismic energy is transmitted down to a series of reflecting boundaries, and is reflected to a plurality of spaced detectors at or near the surface. In addition to these desired primary reflections, seismic energy is repeatedly reflected among several of these boundaries or between the surface and a major subsurface boundary. These repeated reflections are called multiple reflections, or if they are closely spaced in time, may be called reverberation, ringing, singing, and other similar terms.

The output signals from the plurality of spaced detectors are fed into a plurality of amplifiers and recorded. The signals are usually converted from an analog form and recorded on magnetic tape in a digital format. In order to reduce the reverberation or multiple reflections, the processing may include deconvolution such as described by Peacock and Treitel in the Apr., 1969 issue of Geophysics, pages 155 thru 169. The output data may then be corrected for NMO based on the velocity to the desired primary reflections and converted to a visual display. Additional steps may be taken after correction for NMO such as stacking according to U.S. Pat. No. 2,732,906, issued Jan. 31, 1956, to Mayne. In this latter case, the deconvolution may be applied after a series of reflections from a common reflection point have been stacked.

A predictive decomposition of time series with application of the time series to seismic exploration by Enders A. Robinson was published in Geophysics, June, 1967, pages 418 thru 484. This paper includes a mathematical description of the process and an extensive bibliography. Marr and Zagst apply deconvolution to horizontal data stacking techniques of Mayne in Geophysics, Apr., 1967, pages 207 thru 224.

SUMMARY OF THE INVENTION

The method in accordance with this invention is especially suited to improve the deconvolution processes previously cited. The source is usually at an appreciable distance from most of the detectors. Even if both the surface and the reflecting horizon are horizontal, the multiple reflections or reverberations will not be uniformly spaced in time due to the angularity of the path. Since reflecting horizons and the surface of the ground may not be horizontal, additional time variations are present in multiple reflections or reverberations. Even if the detector is at the source, a variation in the thickness of the media causing the reverberation will shift the time interval between the reverberation and make the reverberation non-repetitive. In marine work, changes in the characteristics of the bottom, such as from a hard to a soft surface, may further shift the repetition. My invention comprises the method of introducing the appropriate time variable corrections to make the time interval constant between repeated multiple reflections or reverberations, storing the information as to the time variable corrections, and after deconvolving the modified data, introducing a second group of time variable corrections generated from the difference between the desired NMO correction for primary reflections and the first time variable correction to align the primary reflections (preferably from the same common reflection point) before stacking or making a visual display. In this manner, the multiple reflections or reverberations will have the same time interval between repeated events and are removed by deconvolution.

When the autocorrelation is made in the deconvolution process, there will be a large peak response for this repetitive time interval rather than a series of small peaks for the series of time intervals obtained using the prior art. The automatic design and application of the filter for the large peak can then proceed as is known in the prior art. The preferred form of the second time variable correction would be the NMO based on the velocity of the desired primary reflections as is normally used in the prior art, minus the first time variable correction selected according to my invention. The second time variable correction will usually be negative which means that the time shift is in the opposite direction than the first time variable correction. This is because NMO corrections at any specified time are larger for low velocities than for high velocities.

In summary, the method requires the insertion of additional processing steps before and after deconvolution to overcome complications induced by dip, non-parallel boundaries, and/or remote detectors.

BRIEF DESCRIPTION OF THE DRAWINGS

The above-recited, as well as other, advantages and objects of the invention will become apparent from the drawings and specifications.

FIGS. 5a–5d illustrate apparatus for determining the inverse filter and deconvolving the data.

DESCRIPTION OF A PREFERRED EMBODIMENT

Figure 1:
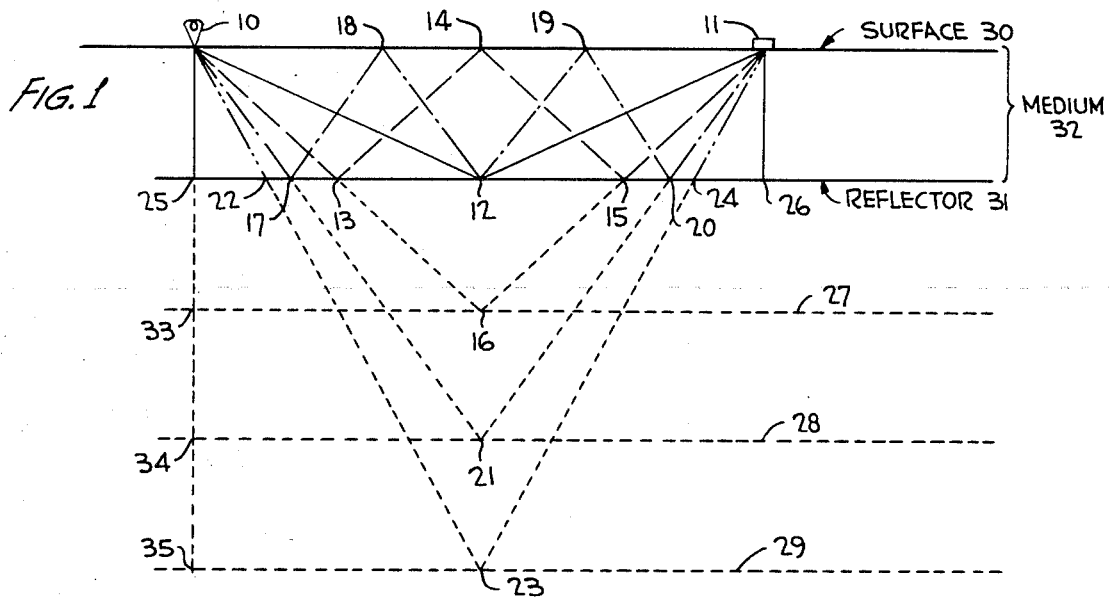
FIG. 1 illustrates the longer path length per reverberation for a low-order multiple reflection and the shorter path length per reverberation for a higher-order multiple reflection.

FIG. 1 illustrates multiple reflections and reverberations from a horizontal reflector 31. Seismic source 10 is located on or near the surface 30 of the water during marine operation, or in the case of land operation source 10 is located on or near the surface of the ground. Seismic energy from source 10 travels down to reflection point 12 on reflector 31 and is reflected up to detector 11 on or near surface 30 as a primary reflection. The seismic energy also follows many other paths such as the multiple reflection from source 10 to reflection point 13 on reflector 31, up to point 14 on the surface ar at the base of the weathered layer, down to reflection point 15 on reflector 31, and up to detector 11 on or near surface 30. If the travel time is sufficiently different than the travel time of other reflections from this same reflector, this path would be considered a multiple reflection. If the reflections overlap, this may be called a reverberation, ringing, singing, etc. Additional multiple reflections or reverberations exist, such as the path from source 10 to reflection point 17 to point 18, to reflection point 12, to point 19, to reflection point 20, to detector 11. Actual measurements of path length could be made to show the path 10-13-14-15-11- is longer per one-way travel path than path 10-17-18-12-19-20-11-. However, it is obvious that the path from source 10 to reflection point 13 is longer than the path from source 10 to reflection point 17, which is longer than the path from source 10 to reflection point 22, and so on, with the final limit of a vertical path from source 10 to reflection point 25. Another way to consider these paths is to use the path images. For example, the path from point 13 to point 16 to point 15 is the image of the path from point 13 to point 14 to point 15 since all corresponding distances are the same but the triangle formed by the paths is inverted. The image path from point 17 to point 21 to point 20, is the same length as the path from point 17 to point 18 to point 12 to point 19 to point 20; however, the image appears as a primary reflection from a deeper horizon with the same velocity as in the medium 32, which is between surface 30 and reflector 31. It can be readily observed from these images that the travel path is progressively longer for the higher order multiple reflections than for a primary reflection. This progressively longer one-way travel path and corresponding travel time seriously deteriorates the effectiveness of deconvolution or decomposition as will be described later. It should be pointed out that if a detector could be used at the source, the successive multiple reflections between a horizontal surface and a horizontal reflector would have the same time interval. Unfortunately, it is seldom possible to use a detector at the source because of noise from the source. Also, economic reasons dictate that a plurality of detectors or detector groups such as 24, 36 or 48 in number be used to record data from each source, and these detectors should have successively greater source-to-detector distances. The horizontal stacking technique of Mayne is the most effective method to attenuate multiple reflections. Since the longest source-to-detector distance in accordance with that technique is usually more than 1 mile and often 2 miles, the non-uniformity of time intervals is very large.

Figure 2:
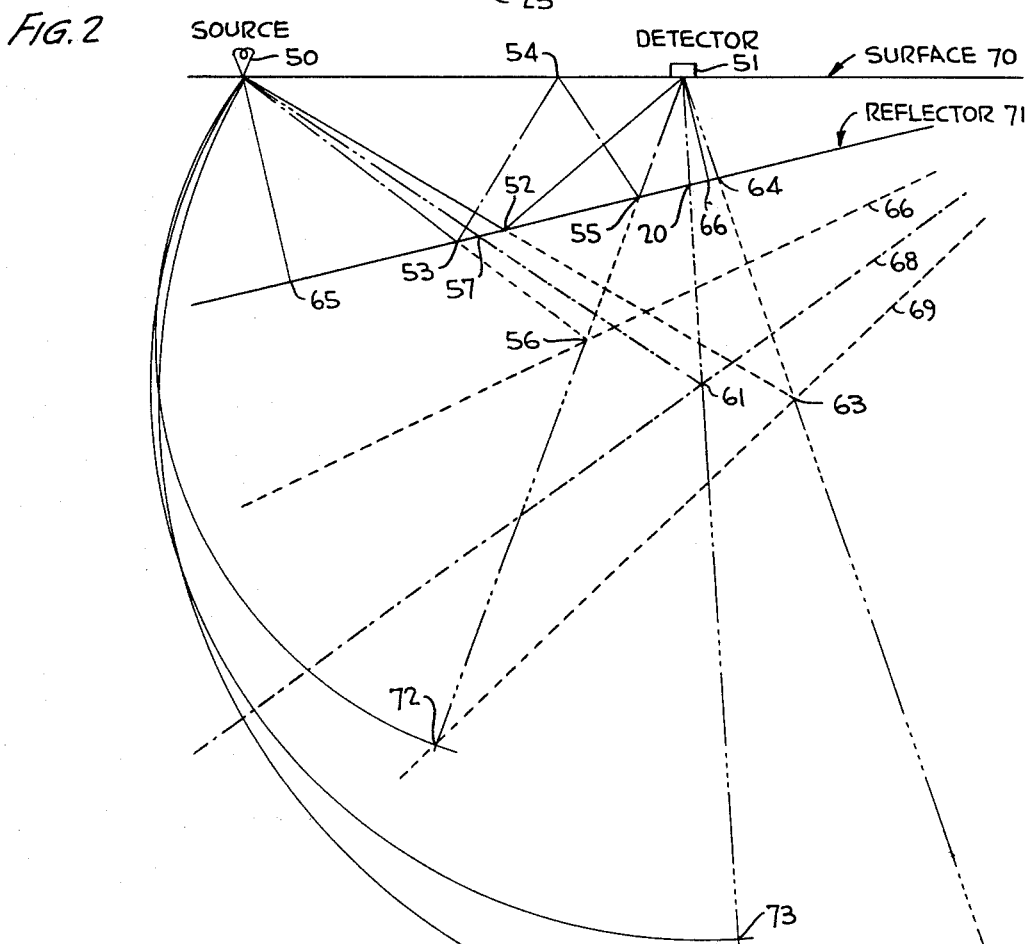
FIG. 2 illustrates the complications introduced where the reflecting horizons have appreciable dip.

FIG. 2 illustrates a further complicating feature, the effects of reflectors having appreciable dip. Seismic energy from source 50 is transmitted as a primary reflection down to reflection point 52 on reflector 71 and up to a detector 51 on or near the surface 70. A multiple reflection is indicated from source 50, down to reflection point 53, up to point 54, down to reflection point 55, and then back to detector 51. An image is dotted from point 53 down to point 56 on reflector image 66 and up to point 55 similar to the image process in FIG. 1. The image of the successive multiple reflections are shown in relation to points 61 and 63. These multiple reflections differ from that obtained from horizontal reflector 31 in FIG. 1. The successive paths in a multiple reflection have different path lengths, for example from source 50 down to reflection point 53 and back up to point 54 is longer than the path from point 54 down to point 55 and back up to detector 51. Hence in this case, the entire path length must be considered so the use of image reflectors 66, 68, and 69 are very useful.

The dip of image reflector 66 is twice that of reflector 71, the dip of image reflector 68 is three times that of reflector 71, and the dip of image reflector 69 is four times that of reflector 71. The total path from source 50 to point 56 to detector 51 can be determined by swinging an arc of a circle from source 50 to point 72 using point 56 as the center and measuring about 6.5 units on this scale from point 72 to detector 51. The total path from source 50 to point 61 to detector 51 is the same as point 73 to detector 51 or about 7.95 units. The total path from source 50 to point 63 to detector 51 is the same as point 74 to detector 51 or about 9.05 units. The difference between consecutive paths is 1.45 (7.95-6.50) units and 1.10 (9.05-7.95) units. While this is a progressing decrease in the path interval, this may not be the case for higher order multiple reflections. Note that reflection point 64 is on the right side of point 66 than points 20 and 55, are on the left side of point 66. The line from detector 51 to point 66 is perpendicular to reflector 71. Reflection points for higher order multiple reflections will be farther to the right and this distance will increase, resulting in longer intervals between high order multiple reflections. This illustrates that the reflections obtained from reflectors of steep dip will vary from the reflections obtained from a horizontal reflector. The high order multiple reflections, or reverberation, are particularly severe in most marine work. There is usually a good reflector near the water bottom, thus resulting in little attenuation of seismic frequencies in the water. In such a situation, hundreds of reverberations may occur on a conventional seismic record. A more complete discussion of multiple reflections and reverberation is described by V. A. Olhovich in Geophysics, December 1964, pages 1,015 thru 1,030. This paper also includes other factors such as the velocity gradation with respect to depth which produces curved ray paths rather than the straight line paths illustrated in FIGS. 1 and 2. Curved ray paths produce further changes in the time interval of multiple reflections or reverberations.

Figure 3:
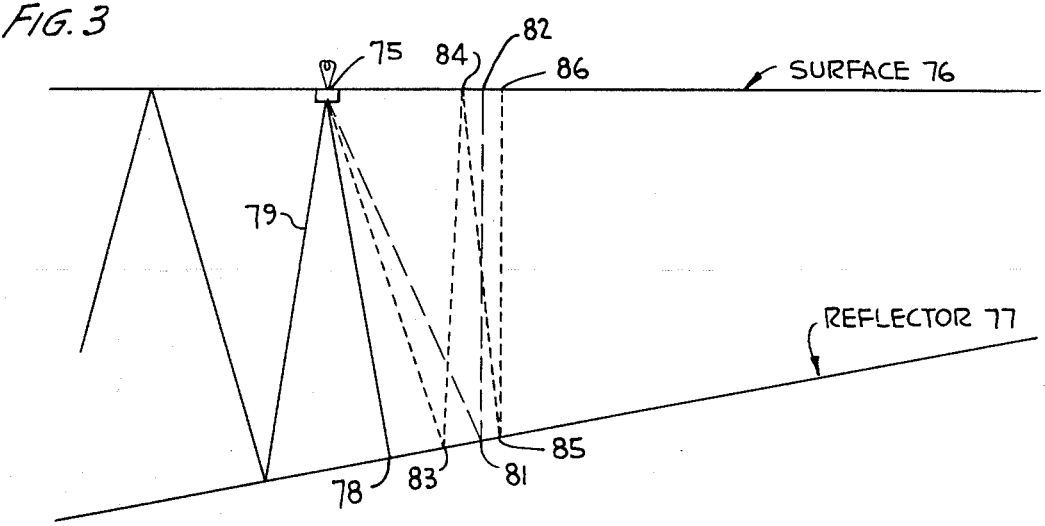
FIG. 3 illustrates a refinement of FIG. 2, with both a detector and a source located at the same surface location.

FIG. 3 illustrates that even with the detector located at the source, a wedge shaped reverberating media would result in non-repetitive multiple reflections or reverberation. Combined source and detector 75 is located on or near surface 76. Energy from source-detector 75 is transmitted to reflector 77 and is reflected at reflection point 78 back to source-detector 75. Multiple reflections do not follow this same path as would be the case in FIG. 1. Energy from reflection point 78 to source-detector 75 could follow path 79 and not return to the source-detector 75. A multiple reflection would have the path from source-detector 75 to reflection point 81 on reflector 77, up to point 82 on or near surface 76, then be reflected back this same path down to reflection point 81, and up to source-detector 75. If the dip of reflector 77 is very steep, only a limited number of reverberations can exist theoretically, but in actual cases many reverberations do exist. High order multiples or reverberations would have paths such as from source-detector 75 to reflection point 83, up to point 84, down to reflection point 85, up to point 86 and return by the same path (down to reflection point 85, up to point 84, down to reflection point 83, and up to source-detector 75).

DECONVOLUTION OF DATA FROM DETECTORS REMOTE FROM THE SOURCE

The following brief description of deconvolution, or decomposition, will indicate the problems encountered when deconvolving data from detectors which are remote from the source.

The terms deconvolution and decomposition define techniques for removing, by inverse filtering techniques, something that was convolved with the data upon recording. The unwanted data sought to be removed can be such things as field instrument responses, water "ringing" effects, multiple reflection interferences, frequency variations from record to record, seismometer depth effects, "peaked" amplitude responses, etc.

The first basic assumption which is made to justify deconvolution, is that all valid primary events are spaced at random times on the seismogram, i.e., primary reflections will not be periodic in nature. Secondly, it is assumed that multiple reflections and reverberations are periodic in nature. Finally, the assertion is made that a balanced or "white" frequency spectrum, and not a "peaked" spectrum, is necessary for valid data character enhancement and resolution.

The tool must be found that will yield the necessary information about the periodicity of the unwanted data, and the frequency content of the unwanted data. This tool is the auto correlation function. From this function, the amplitude response and the phase response of the periodic events are determinable. With the phase and amplitude response of the unwanted signal defined, an inverse filter is designed, using the inverse amplitude and phase characteristics of the unwanted data, which when convolved with the trace will remove or greatly suppress, the unwanted signal.

To be more specific, a filter is designed with the multiplicative inverse of the amplitude response of the unwanted data, and the additive inverse of its phase response. Due to the fact the convolution process multiplies the amplitude response and adds the phase response, the unwanted data is removed by application of this inverse operator.

Now it is apparent that "peaked" amplitude responses due to bandlimited field recording, seismometer depths, ringing, etc., can be removed with inverse filtering, or deconvolution. It is also apparent that events of a periodic nature are removed due to the inverse phase response of the operator.

The second assumption is that multiple reflections and reverberations are periodic in time. This assumption does not apply to data from detectors remote from the source. This assumption does apply, however, to data recorded by a detector at the source if the reflector is horizontal. The crux of this invention is the method of, and means for, converting these multiple reflections or reverberations into repetitive events prior to deconvolution, then after deconvolution, essentially removing the correction previously applied. The latter step is preferably combined with the introduction of NMO for the desired deep primary reflections to reduce computer time.

If the reflector causing the multiple reflections or reverberations is substantially horizontal, a simple method can be applied with minimum effort. FIG. 1 illustrates that the image reflections can duplicate the travel paths of the multiple reflections. For example, the path from source 10 to reflection point 13, thence to point 14, thence to point 15, thence to detector 11 is the same length as the path from source 10 to image point 16 and then to detector 11. The average velocity down to reflector image 27 would effectively be the same as in medium 32 down to reflector 31. Similar conditions apply to the other image paths 21 and 23. Hence this reverberation in medium 32 can be represented as a series of primary reflections from a series of equally spaced reflector images. The velocity in the entire section would be the same as in medium 32. In the case of marine work, this would be water velocity when the reverberation is in the water. Paths 10–16–11–, 10–21–11–, and 10–23–11– can be converted to paths 10–33–10–, 10–34–10–, and 10–35–10– respectively by application of normal moveout, NMO, using a8 constant velocity of the medium 32. Then the reverberations on the corrected data would have constant time intervals because the distant intervals 25 thru 33, 33 to 34, and 34 to 35 are equal and the velocity is a constant. This is a simple process and can readily be applied by a properly programmed digital computer.

Figure 4:
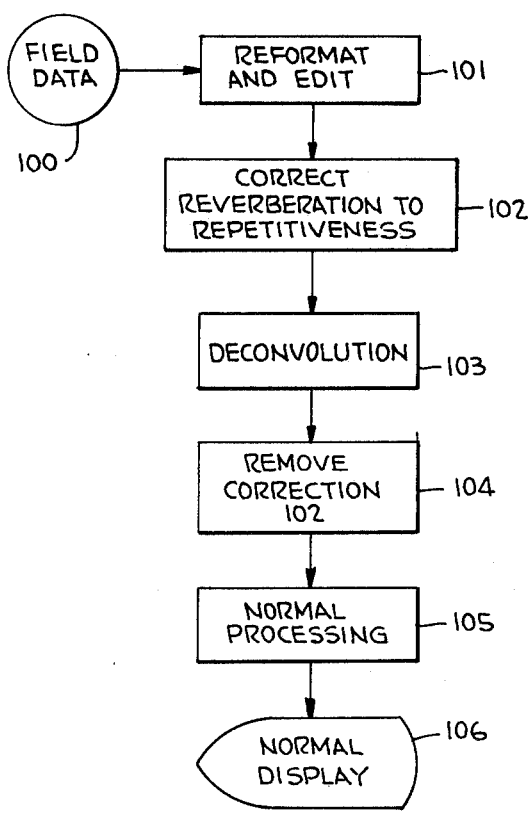
FIG. 4 illustrates the steps of the invention.

FIG. 4 is a flow chart of the steps for carrying out the invention. The field data is usually recorded in digital format on magnetic tape. The tape is sent to the processing center and placed on a digital tape transport where the data is read into a digital computer at 100. If necessary, the data is reformatted and edited at 101. Reformatting and editing may be necessary, for example, to conform the data to the format of the computer and the program utilized for operating it. Static corrections due to elevation, weathering, and similar constant time shifts are introduced at 102. If the reflector is essentially horizontal, as is the case in many areas, an NMO is applied to the data in 102 using the average velocity in the media causing the reverberation. This NMO can be computed using travel paths such as shown in FIG. 1 and determining the difference in travel time between the diagonal and vertical paths. This difference is the NMO correction. A conventional deconvolution or decomposition is applied at 103. After deconvolution, the NMO applied to the data at 102 is removed therefrom by application of the correction in the opposite sense or direction. Then normal methods of seismic processing, such as horizontal stacking, are applied at 105 and any desired display of the processed data is prepared at 106. It is usually more efficient to remove the correction applied at 102 simultaneously with the removal of NMO for the primary reflections. To accomplish this, a time variant correction is applied to the deconvolved data at 104. This preferred correction is equal to the NMO for deep primary reflections minus the NMO for multiple reflections applied at 102.

In marine seismology, the vertical velocity, necessary to determine the NMO correction to be applied to the data to make the multiple reflections and/or the reverberations periodic or cyclic, can be actually measured by well-known techniques without the need for computation. For example, the vertical velocity of the seismic signal at any given location over water can be determined by timing the seismic signal as it travels between a plate suspended below the hull of the vessel and another plate positioned at a known depth below the first plate. Such measurements employing sonar techniques are well known to those skilled in the art.

For seismic surveys conducted on land, the necessary vertical velocity data is sometimes available from well surveys, for example. In any event, where it is necessary to compute the required velocity information it can be determined in the following manner.

The preferred embodiment for determining the necessary corrections to make the multiple reflections and/or the reverberations periodic or cyclic is to use cross-correlation techniques. A method using such techniques for determining seismic velocity is set forth in application, Ser. No. 765,943, filed Oct. 8, 1968, and assigned to the same assignee as this application. It is to be understood that the specification of the aforementioned copending application is to be a reference herein for the purpose of setting forth a method whereby the necessary seismic velocities may be calculated by an apparatus without the need for pencil and paper, or graphical analysis, so that the aforementioned corrections may be determined and applied at 102.

In accordance with the disclosure of the copending application, the seismic data is collected into groups according to the various common reflection points, and selected traces are cross-correlated over a number of different correlation intervals. The time shifts between the correlated signals and the center of the correlation intervals are determined and used to compute the seismic velocities. The computed velocities are compared with initially assumed velocities to retain only those computed velocities that are within a predetermined velocity interval. A mean velocity is obtained from the retained velocity values which may be used to provide a moveout table. The velocity intervals used with this invention in the method of the copending application may be determined in accordance with the results desired. For example, the first velocity interval may be from zero to 3,000 ft/sec. and the successive velocity intervals may increase in 3,000 ft/sec. intervals.

Furthermore, in accordance with the velocity determination, briefly described above, overlapping correlation intervals or "time gates" are applied successively to the entire seismic signal to obtain time shifts corresponding to the correlation intervals to obtain the time shifts for computing the velocity data. Where the dip is not constant, in accordance with the present invention, the time gates used are comparable to a few cycles of the reverberation. Where the dip is constant, or in the case where there are parallel reflection or refraction boundaries, the time gates selected in accordance with the description of the aforementioned copending application is sufficient.

Another alternative for providing the corrections at 102 is to determine a series of time delays for various record times, and the time delay values could be used for correcting reverberations to a repetitive nature.

In the event that the aforementioned cross-correlations result in an ambiguity as to the cycles which correlate, the cross-correlations may begin at the end of the recorded seismic data and proceed back toward the start of the data. At the end of a set of seismic data, there is little time difference between the seismic signals from various detectors having different source-to-detector distance, because, as is well known, the moveout at large source-to-detector distances is small.

The deconvolution technique utilized at 103 to remove the unwanted reflections or reverberations may be any of the standard types now in use or those briefly mentioned above. The preferred manner of removing the time variable corrections applied at 102, after the deconvolution, is to apply the NMO for the primary reflections as previously described.

The normal processing at 105 may include filtering, automatic gain insertion, and an NMO correction for desired primary reflections. The display at 106 may consist of only a seismic record section. However, in general, normal processing at 105 would include the horizontal stacking technique of Mayne after the NMO is applied for the desired primary reflection. The normal display at 106 may be obtained from a visual monitor, photographic seismic record sections, holographic displays, or any display technique known in the art.

This invention is not limited by the type of seismic source utilized to create the seismic energy and the seismic source may consist of an explosion, a weight-drop, a sudden release of air from an air gun, or any other source known to the seismologist. For example, a continuous vibrator having a constant frequency may be used in conjection with a holographic display. A chirp-type or FM seismic source could be used where the frequency is shifted over a few octaves such as is done with a Vibroseis system.

A factor, however, which must be considered with the specific type of seismic source utilized is whether the data at 101 requires remodification, reformatting, or editing. For example, if either of the aforementioned latter two types of seismic sources are used, the data must be reformatted and edited prior to being corrected at 102. Such reformatting and editing is known to those skilled in the art and forms no part of the present invention. Holographic data may be correlated with Fresnel zone strips or similar processes which are known. The seismic data from a chirp-type source could be cross-correlated with the pilot trace (a recording of the chirp applied to the earth). Should there be an insufficient frequency shift, or if the higher frequencies were severely attenuated in the earth, intense ringing is observed with such a seismic source. The present invention is also applicable to remove ringing from the seismic data created by the seismic source.

It is to be understood that the use of the method disclosed herein does not eliminate the necessity for the application of many processing routines which are now normally associated with deconvolution techniques. Prewhitening is still required in those instances where it is necessary prior to normal deconvolution. The requirements for prewhitening have been described by Blackman and Tukey in "The Measurement of Power Spectra from the Point of View of Communication Engineering", Dover Publications, Inc., New York, 1959.

However, the particular method for the design of the inverse filter used in the deconvolution of the data is not critical in the present invention. In general, if the multiple reflections or reverberations are made sufficiently close to a repetitive nature, almost any type of deconvolution may be employed.

In the preceding description, in applying the NMO correction, data from a remote detector was shifted to the time of the data from a near detector. This simplified the description of the invention, but is not a necessary requirement. Any reference time could be used if the multiple reflections or reverberations are made repetitive. For example, in the processing of seismic data under certain conditions, a reference intermediate the source and the most remote detector is preferred so that part of the data will be shifted in one direction and part of the data shifted in the opposite direction. This has the advantage that none of the data will be shifted as much as when the reference is a near detector, for example. The important concept to bear in mind is that the corrections which are removed from the data after deconvolution must be applied in the opposite direction or sense of the NMO corrections which were introduced into the data prior to the step of deconvolution. Thus, in the above instance, part of the seismic data after deconvolution will also be shifted in one direction and the remaining portion of the siemic data will be shifted in the opposite direction.

Frequently there is only one shallow media that causes serious reverberations and multiple reflections. However, if there are more than one series of reverberations, particularly from shallow media, the steps at 102, 103, and 104 would be repeated for each series of reverberations.

DESCRIPTION OF APPARATUS

Figure 5D:
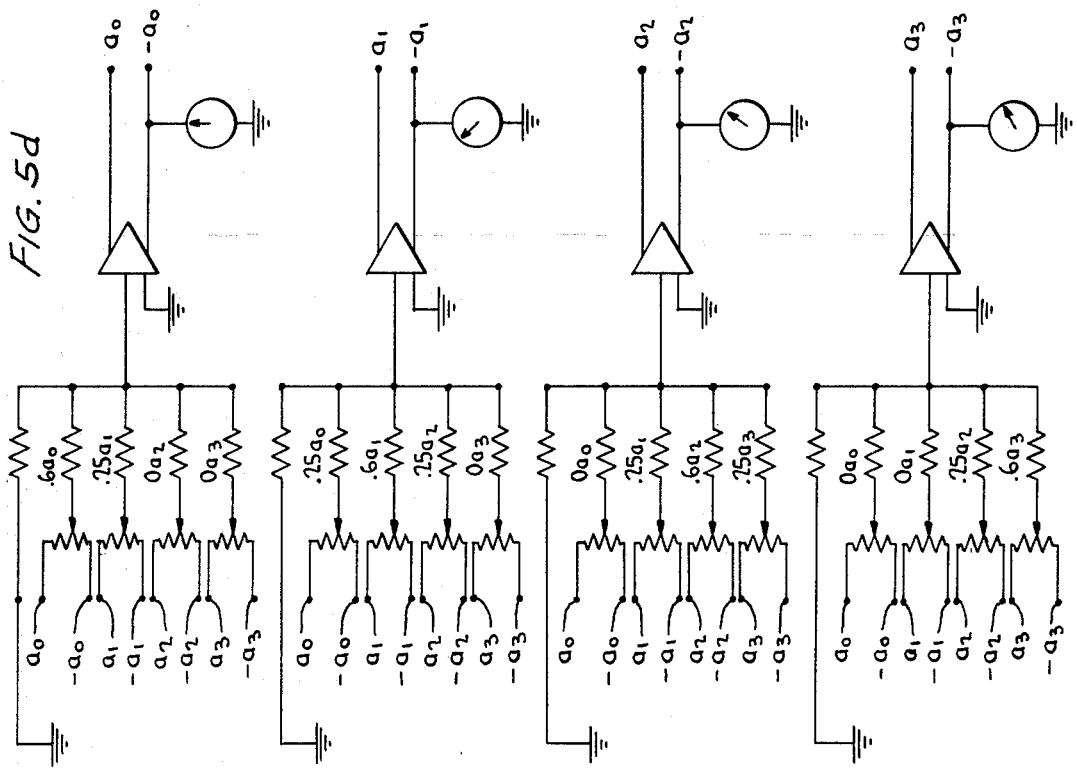
Figure 5A:
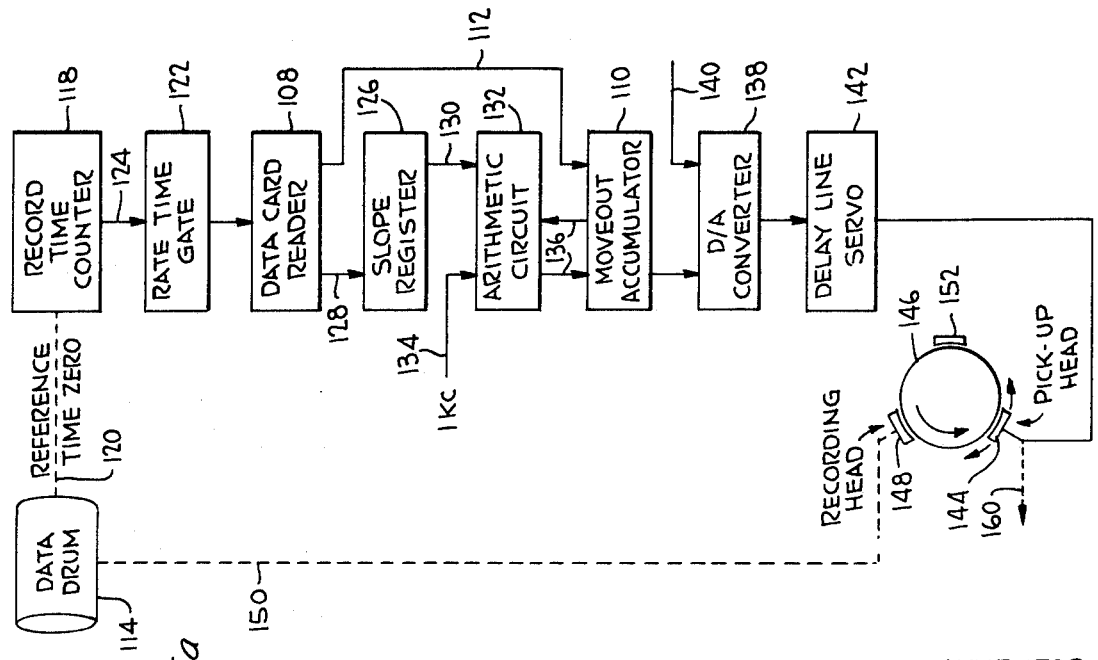
FIG. 5a shows apparatus for applying and removing corrections from the seismic data.

The apparatus for applying the corrections at 102 and removing the corrections at 104 is illustrated in FIG. 5a. This apparatus is disclosed in U.S. Pat. No. 3,348,194, issued Oct. 17, 1967 to William W. Witt et al. Briefly, in accordance with the description therein, data card reader 108 inserts the necessary information in moveout accumula tor 110 via line 112. Data drum 112 contains the seismic information and also has recorded thereon a zero time indication. Simultaneously with the transmission of the recorded data on drum 114 along line 116, the reference time zero pulse is transmitted from drum 114 to record time counter 118 along line 120. At zero time, a pulse is initiated from record time counter 118 through rate time gate 122 via line 124. Rate time gate 122 is thereby conditioned so that data card reader 108 inserts the initial slope condition into slope register 126 via line 128.

Output 130 of slope register 126 is provided to arithmetic circuit 132 in accordance with control pulses from a 1kHz oscillator via line 134. The output of arithmetic circuit 132 is inputted to moveout accumulator 110 by line 136 and at every occurence of input 134, the count in moveout accumulator 110 is updated by the count in slope register 126. After a predetermined calculation interval, rate time gate 122 conditions card reader 108 to input the next information to moveout accumulator 110 and slope register 126, and the preceding operation is repeated.

After the calculations have been concluded, the output from moveout accumulator 110 is applied to digital-to-analog converter 138 which is driven by a chopper signal on line 140. Converter 138 then drives delay line servo 142 to position pick up head 144 in the following manner. Recording medium 146 is constantly rotated in the direction indicated. Recording head 148 is fixedly disposed opposite the recording surface of medium 146 to receive the uncorrected seismic data signal on line 150 Pick up head 144 is rotated in either direction along the surface of medium 146 in accordance with the output from delay line servo 142 to provide the necessary time correction to the seismic data from data drum 114. Erase head 152 clears the medium 146 after data has been sensed by pick up head 144.

The foregoing description is applicable for the apparatus at 102, however in accordance with this invention, the data applied at 102 is removed after the deconvolution of the data at 103. This can be accomplished with the same apparatus merely by altering the sign of the data within data card reader 108 so that information from slope register 126 which has previously added to the count within moveout accumulator 110 is subtracted and vice-versa.

Figure 5B:
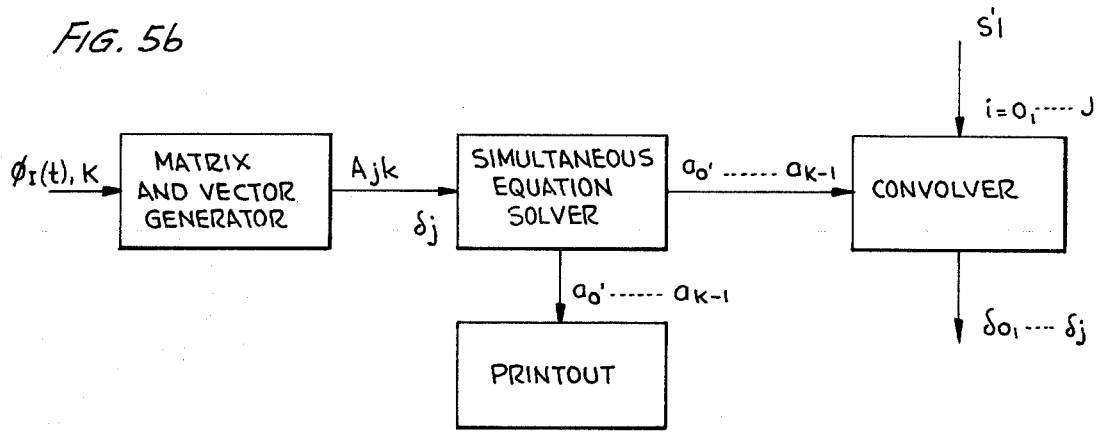
Figure 5C:
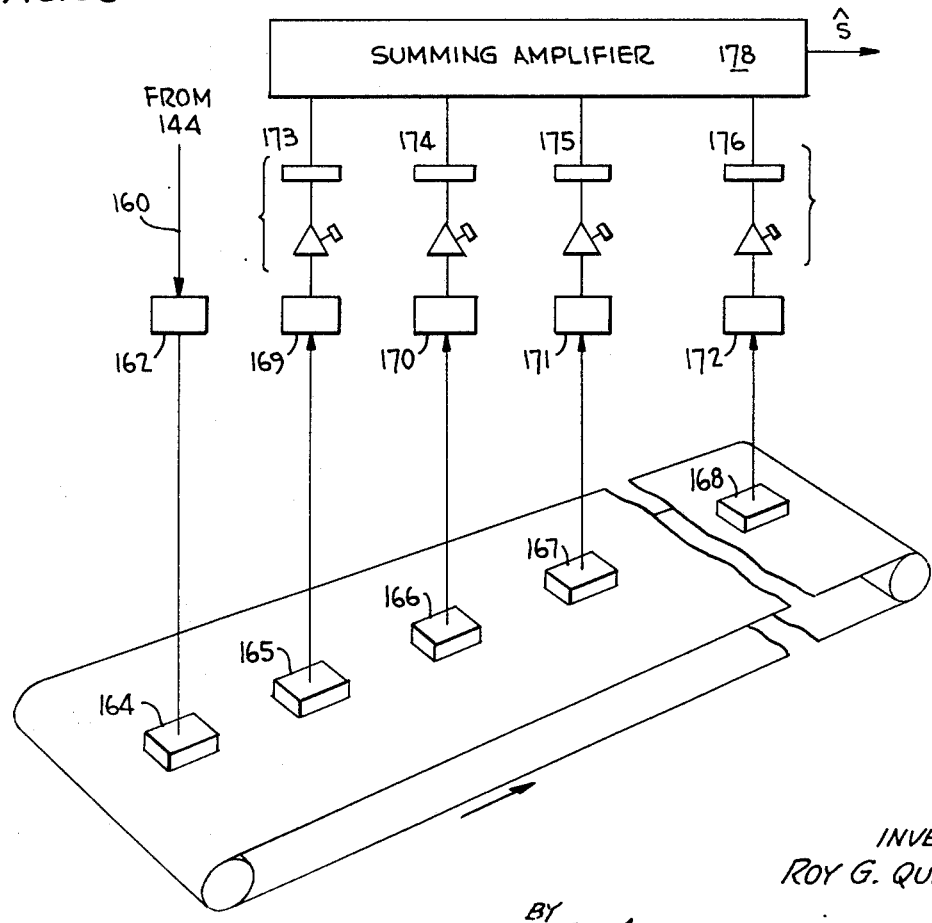

Apparatus for performing the necessary deconvolution required at 103 is illustrated in FIGS. 5b–5d and is taken from Canadian Pat. No. 800,163, issued on Nov. 26, 1968 to Foster et al. FIGS. 5b, 5c, and 5d of this specification respectively conform to FIGS. 3, 4 and 5 of the aforementioned patent. The description in the Canadian Patent beginning at page 22, line 10 and continuing to page 31, line 9 is particularly pertinent to the operation of the apparatus of the aforementioned figures. The description therein is considered to be adequate for the purposes of understanding the operation of the apparatus as well as for practicing this invention, and will not be described in detail herein.

Briefly, the circuitry illustrated in block diagram format in FIG. 5b determines the inverse operator and the convolution of the data with the inverse operator. It is known that convolution of seismic data with an inverse operator is deconvolution as the term is used within the context of this invention. The analog apparatus shown in FIG. 5c is capable of implementing a time domain inverse filter, and convolving seismic data therewith, and the analog computer of FIG. 5d solves the necessary simultaneous equations for determining the coefficients of the inverse filter.

Thus, in accordance with this invention, the data from pick up head 144 on line 160, at 102 of FIG. 4, is applied by way of amplifier 162 to recording head 164 of magnetic belt 164 to record the data thereon for deconvolution. As the tape moves, the recorded seismic data is moved toward and under pickup heads 165, 166, 167, 168. The number of pick up heads is determined by the number of coefficients of the inverse filter. Each of the pick up heads is respectively connected to FM demodulators 169,170,171,172, and in turn, to amplitude and polarity determining devices 173,174,175,176. Each of the latter devices includes a variable gain amplifier and a polarity reversing switch as described in the aforementioned patent at page 30. The inverse filter is defined by adjustment of the amplifier gain and polarity switch of the respective devices 173–176 thereby convolving the input signal on line 160 with the inverse filter. The signal output from devices 173–176 is recorded by summing amplifier 178 whereupon the data may then be sent to suitable apparatus for further processing as described above.

The invention is also applicable to seismic refraction data. Furthermore reverberations may mask the desired refracted data and conventionally applied deconvolution deteriorates the refracted data because the source-to-detector distances are very large. The preferred form of the invention as applied to refraction data would comprise the following three steps. The introduction of a first time variable correction to make the reverberations repetitive. Deconvolution of the corrected data and the introduction of a second time variable shift wherein the time shift would be equal in magnitude, but opposite in direction, to the first time shift correction. The time shift first introduced is an NMO determined for reflections based on the velocity in the reverberating media, if the boundaries are parallel. If the boundaries are not parallel, the type of cross-correlation used for reflection data is appropriate.

The equivalence between analog and digital techniques, as well as the apparatus for performing such techniques, is known to those skilled in the art to which this invention is related. So is the equivalence also known between analog and digital computers. That is, that which can be computed by an analog computer or analog circuitry may also be computed by a suitably programmed general purpose digital computer or digital circuitry. Therefore, the method and apparatus of this invention may comprise such analogous digital techniques because the modifications necessary to so adapt the analog techniques and circuitry described herein are well within the ordinary skill of one skilled in the art.

Furthermore, the invention claimed and described herein is not intended to be carried out by an operator using paper and pencil manipulations. The utility of the invention resides entirely in the use and employment of apparatus for automatically carrying out the invention. The use of paper and pencil manipulations to perform the claimed invention would reduce its utility solely to the performance of an academic exercise which would not advance the state of the art to which the invention relates. The necessary time and effort expended in such paper and pencil manipulations perforce have little or no economic or commercial value. They are therefore not within that which is contemplated by this invention and the use of paper and pencil manipulations to carry out this invention are dedicated to the public for whatever utility such practice conveys.

What is claimed is:

1. The method of processing within an automated data processing machine the seismic data that is obtained from the detection and recordation of seismic energy released from a seismic source to a plurality of detectors, wherein at least one of the detectors is remote from the energy source, comprising the steps of:
   a. introducing a first time variable shift in said seismic data from at least one of said detectors remote from said energy source by automated data processing means;
   b. deconvolving said time shifted data within an automated data processing means; and
   c. introducing a second time variable shift in said deconvolved data in the opposite direction from said first time variable shift by automated data processing means.

2. The method of claim 1 wherein reverberations are present in said seismic data and said time shift in step (a) is equal to the normal moveout determined for the velocity of said reverberations in the media through which said seismic energy has passed.

3. The method of claim 1 wherein reverberations are present in said seismic data and said time shift in step (a) shifts the the reverberations so that they are periodic.

4. The method of claim 1 wherein step (b) further comprises cross-correlating within an automated data processor limited time portions of the data from a close detector with corresponding time portions of data from said remote detector and using the time delay obtained therefrom for the time shift.

5. The method of claim 1 wherein said second time variable shift in step (c) is equal to the difference between the normal moveout of desired primary reflections and said first time variable shift.

6. Apparatus for automatically processing seismic data that is obtained from the detection and recordation of seismic energy released from a seismic source to a plurality of detectors, wherein at least one of the detectors is remote from the energy source, comprising;
   apparatus for introducing a time variable shift in said seismic data from at least one of said detectors remote from said energy source,
   apparatus for deconvolving said time shifted data, and
   apparatus for introducing a second time variable shift in said deconvolved data in the opposite direction from said first time variable shift,.

* * * * *